March 18, 1941.  H. A. KRUEGER  2,235,220
WINDOW SHUTTER
Filed Aug. 28, 1940
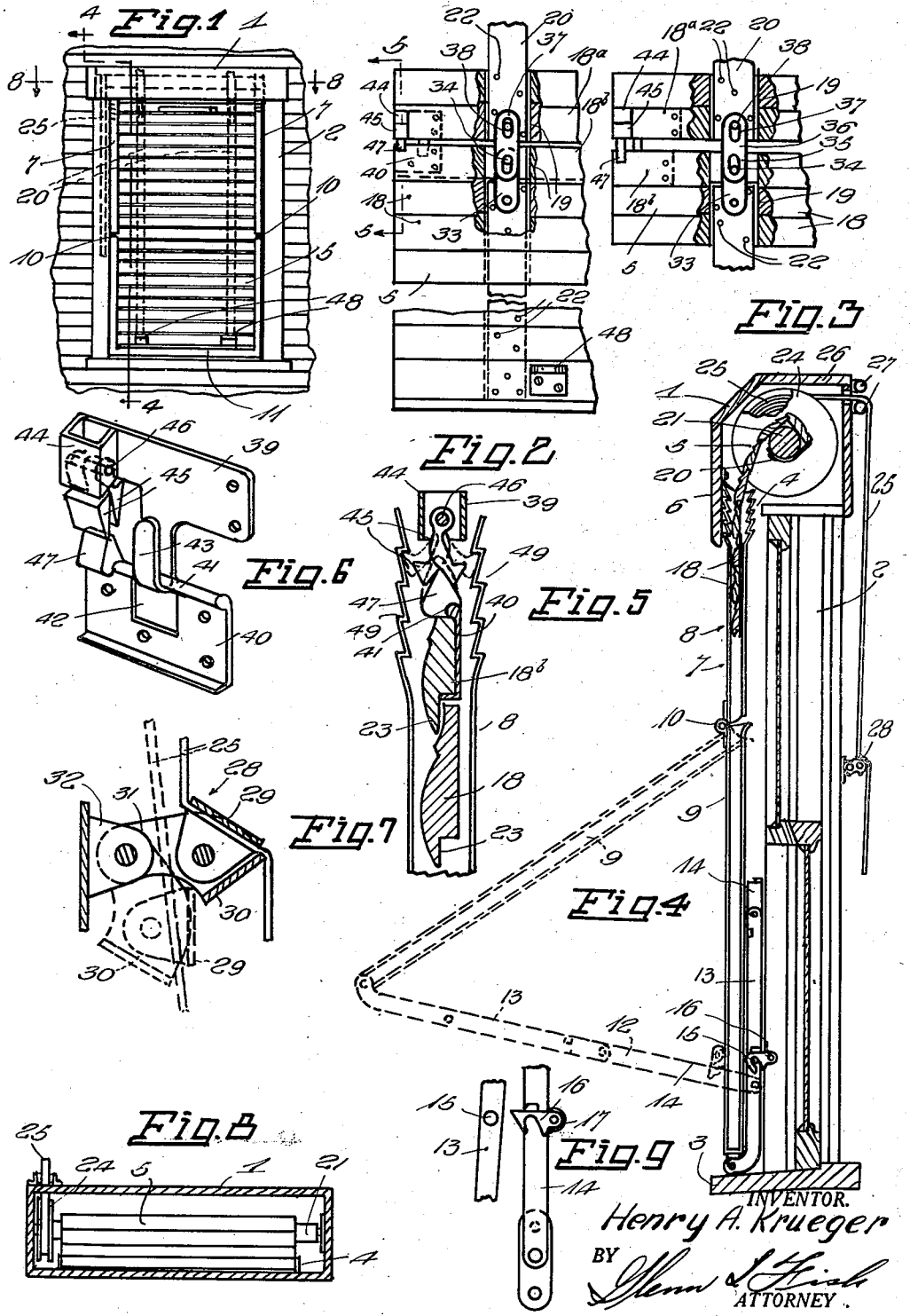
INVENTOR.
Henry A. Krueger
BY
ATTORNEY Patented Mar. 18, 1941

2,235,220

UNITED STATES PATENT OFFICE 2,235,220

WINDOW SHUTTER

Henry A. Krueger, Spokane, Wash.

Application August 28, 1940, Serial No. 354,616

4 Claims. (Cl. 20—61)

This invention relates to a window shutter and it is one object of the invention to provide a shutter of such construction that while it may be easily adjusted and moved to open position from within a room it may not be opened by a person outside the room. It will thus be seen that the shutter is burglar-proof.

Another object of the invention is to provide a shutter formed of slats so connected with each other that they form a flexible curtain which is rolled upon a roller mounted in a box or housing at the top of a window, tracks being provided at opposite sides of the window for guiding movement of the shutter and holding same in place when in lowered or closed position.

Another object of the invention is to provide a shutter of this character wherein certain slats located near the top of the window when the shutter is in lowered or closed position, are so connected with each other that while the shutter may be drawn upwardly to open position when the roller is turned to wind the shutter thereon, it will be impossible for a person outside the window to shift the shutter upwardly from its lower end to obtain access to a room through the window.

Another object of the invention is to provide improved means for rotating the roller to wind the flexible shutter thereon and then securing a strap by means of which the roller is turned and prevent the roller from turning in a direction permitting unwinding of the shutter by its own weight.

Another object of the invention is to provide tracks for the shutter having lower portions so mounted that they may be swung outwardly and secured in inclined position which will allow air to enter a room but prevent rain from entering the room through an open window.

In the accompanying drawing:

Fig. 1 is a view looking at a window from the outside with my improved shutter in lowered or closed position.

Fig. 2 is a fragmentary view of the shutter looking at the inner side thereof and illustrating the manner in which the upper and lower sections of the shutter are connected with each other.

Fig. 3 is a view similar to Fig. 2, showing the upper and lower sections of the shutter shifted away from each other.

Fig. 4 is a sectional view taken vertically on the line 4—4 of Fig. 1.

Fig. 5 is a fragmentary sectional view on the line 5—5 of Fig. 2 and showing the manner in which upward movement of the shutter from the outside is prevented.

Fig. 6 is a perspective view of a set of members for preventing opening of the shutter from outside the window.

Fig. 7 is a sectional view on an enlarged scale, of the means for releasably securing the actuating strap and preventing rotation of the roller in a direction to unwind the shutter after it has been raised.

Fig. 8 is a sectional view through the head box on the line 8—8 of Fig. 1.

Fig. 9 is a fragmentary view of one of the break joint braces for holding the lower portion of the shutter and lower track sections at an outward incline.

This shutter is applied to a window as shown in Figs. 1 and 4, and one of its elements consists of a head box 1 which extends across the upper end of the window frame 2. This box projects outwardly from the window frame over the sill 3 and is formed with a lower opening 4 through which the flexible curtain 5 passes into and out of the box. The outer wall 6 of the box extends downwardly as shown in Fig. 4, and to the depending portion of this wall are secured tracks 7 having upper and lower sections 8 and 9 which are hinged to each other as shown at 10. Lower ends of the lower track sections of the two tracks are connected by a cross bar 11 so that the lower track sections may be swung outwardly as a unit and these track sections and the lower portion of the curtain supported at an outward incline as indicated by dotted lines in Fig. 4. Break joint braces 12 having sections 13 and 14 are provided at opposite sides of the window, the sections 13 of the braces being pivoted to lower ends of the track sections 9 and sections 14 being pivoted to side portions of the window frame. The section 13 of each brace carries a pin 15 for engagement by a latch 16 which is pivoted to an ear 17 extending laterally from the section 14. When the pins of the brace sections 13 of the two braces are engaged by the latches, the braces will be held folded and the track sections 9 will be held in the position shown in full lines in Fig. 4, and when the latches are moved to releasing position, the lower track sections may be swung outwardly to the inclined position indicated by dotted lines where they will be supported by the extended braces.

The flexible curtain 5, which constitutes the shutter, consists of a plurality of slats 18 formed adjacent opposite side edges of the curtain with alined openings 19 to receive flexible bands or straps 20. The slats may be formed of wood, metal, or other suitable material and the bands may also be formed of flexible metal or other suitable material, and upper ends of the straps are secured to a roller 21 about which the curtain is to be wound when it is in raised or open position. Rivets or the like 22 are employed to fixedly secure the slats to the flexible bands in such spaced relation to each other that the curtain may be wound about the roller. This is clearly shown in Fig. 5, and referring to this figure, it will be seen that the slats are formed with depending lips 23 which overlap the spaces between the slats and serve as shields for these spaces.

A drum 24 at one end of the roller carries an actuating line or strap 25 which is passed through the opening 26 formed in the head box 1 and after being passed between the guide rollers 27, is carried downwardly and engaged with the securing device 28 carried by the window frame at one side thereof in such position that it may be easily reached by a person within the room with which the window communicates. When the actuating line is drawn downwardly the roller will be turned to wind the curtain thereon and raise it to open position. When the line is released from the fastener 28, the weight of the curtain will cause it to unwind from the roller and it will move downwardly to closed position, in which position it blocks the window and very effectively prevents entrance into the room through the window.

The securing device 28 is constructed as shown in Fig. 7, and referring to this figure, it will be seen that the jaw 29, which is of U-shaped formation, is pivotally carried by a companion U-shaped jaw 30 which has its arms 31 pivoted to a bracket 32 fixed to the window frame. When the line or strap 25 is pulled downward to wind the curtain upon the roller 21 and pulling action then discontinued, the tendency of the curtain to unwind will exert upward pull on the line and the jaw 29 will be tilted outwardly while the jaw 30 is tilted upwardly. This causes the line 25 to be gripped between the bridge portions of the two jaws and the curtain or flexible shutter will be held in open position, which may be fully open or only partially open. When it is desired to have the shutter move downwardly to closed position, the jaw 30 is grasped and held in downturned position indicated by dotted lines in Fig. 7, and as the line 25 is released, the jaw 29 will swing upwardly away from jaw 30 and the line will be free to move upwardly and wind upon the drum 24 as the curtain unwinds.

In order to permit the curtain to be wound upon the roller when actuated by the pull line 25 but prevent it from being shifted upwardly to open position by a person outside the window, the curtain has been divided to provide upper and lower sections, as shown in Figs. 2 and 3. Referring to these figures, it will be seen that between the slats 18a and 18b, which are at adjoining ends of the two sections, the bands or tapes 20 are cut to provide upper and lower sections. Each lower tape section carries a plate 33 from which extends a pin 34, and this pin is slidably engaged in the lower slot 35 of a link or plate 36. The upper portion of the link 36 is also formed with a slot 37 to slidably receive the pin 38 carried by the slat 18a of the upper curtain section. Under normal conditions, the lower shutter section is suspended from the upper shutter section and the pins are disposed at outer ends of the slots 35 and 37, but if it is endeavored to shift the shutter upwardly to raised position by grasping its lower end portion, the pins 34 will be shifted upwardly in slots 35 and the links 36 will then be shifted upwardly until the pins 38 reach the lower ends of the slots 37. The slats 18a and 18b will then be positioned close to each other as shown in Fig. 2. Plates or brackets 39 and 40 are secured against inner faces of the slats 18a and 18b, adjacent each side edge of the curtain, the lower plate 40 being formed with an upper cross bar 41 which bridges an opening 42 so that the hook 43 extending downwardly from plate 39 may be engaged with the cross bar, as shown in Fig. 6. A box-like bracket 44 projects outwardly from one end of the plate 39 and constitutes a mounting for dogs 45 which are pivotally mounted by the pin 46. The dogs extend downwardly and are curved longitudinally so that their lower ends diverge, as shown in Fig. 5. These lower ends are disposed in straddling relation to an upwardly tapered lug 47 which projects upwardly from plate 40 and constitutes a cam for swinging the dogs away from each other when the curtain is grasped by the fingerholds 48 and an endeavor made to open the shutter by upward thrust. When the shutter is wound upon the roller, the fingerholds serve as abutments for engaging the depending portion of the outer wall 6 of the head box 1 and limiting winding of the shutter upon the roller. Upper end portions of side flanges of the tracks 8 are cut free and bent to form crimped tongues constituting resilient racks between which the dogs are located. When the dogs are spread by cam action of the wedge 41, they have gripping engagement with teeth of the racks 49 and very effectively prevent upward movement of the shutter or curtain by a person standing outside the window and grasping the fingerholds 48. It will thus be seen that a burglar cannot enter a room through a window guarded by a shutter of the improved construction. When the actuating line 25 is drawn upon to wind the curtain or shutter upon the roller, upward pull exerted upon the upper portion of the curtain will cause the dogs to be shifted upwardly from the lugs 47 and the dogs will hang free from the racks. Therefore, the dogs will not interfere with opening of the shutter from within the room.

Having thus described the invention, what is claimed is:

1. In a structure of the character described, a head box open along its bottom, tracks extending vertically under end portions of the box, a roller in said box, a flexible curtain wound upon said roller and extending out of the box through the open end thereof, said curtain having upper and lower sections, means for shiftably connecting the lower section with the upper section and limiting vertical movement of the sections relative to each other, tracks for engaging side portions of the curtain and guiding vertical movement thereof, a rack extending longitudinally of one track, a dog carried by the upper curtain section and normally out of engagement with the rack, and means carried by the lower curtain section for engaging the dog and moving the dog into engagement with the rack to hold the curtain against upward movement to open position when the lower curtain is shifted upwardly relative to the upper curtain section.

2. In a structure of the character described, a head box open along its bottom, tracks extending vertically under end portions of the box, a roller in said box, a flexible curtain wound upon said roller and extending out of the box through the open end thereof, said curtain having upper and lower sections, means for shiftably connecting the lower section with the upper section and limiting vertical movement of the sections relative to each other, tracks for engaging side portions of the curtain and guiding vertical movement thereof, inner and outer resilient racks extending upwardly from one track, dogs pivotally carried by the upper curtain section and extending downwardly between the racks when the curtain is in lowered closed position, and a cam carried by the lower curtain section between the dogs for moving the dogs into engagement with the racks and preventing upward movement of the curtain to open position when it is attempted to raise the curtain by shifting the lower section upwardly relative to the upper curtain section.

3. In a device of the character described, a head box, a roller rotatably mounted therein, a flexible curtain wound upon said roller and extending out of the box, vertical tracks for engaging opposite side edge portions of the curtain when the curtain is unwound from the roller to lowered position, the upper end of one track being provided with upwardly extending inner and outer resilient racks, said curtain having an upper section, and a lower section connected with the upper section for limited vertical movement relative to the upper curtain section, brackets carried by the upper and lower curtain sections, a hook carried by the upper bracket and loosely engaging the lower bracket, a bearing box projecting forwardly from the upper bracket, dogs pivotally mounted in the bearing and extending downwardly therefrom and having hook heads at their lower ends diverging from each other toward the inner and outer racks, and an upwardly tapered lug extending upwardly from the lower bracket between the heads of said dogs and constituting a cam for moving the dogs into engagement with the racks to prevent upward movement of the curtain when it is attempted to raise the curtain by shifting the lower curtain section upwardly toward the upper curtain section.

4. In a device of the character described, a head box, a roller in the box, tracks extending vertically under opposite end portions of the box, racks between the box and upper ends of the tracks, a flexible curtain wound upon said roller and passing out of the box in engagement with the tracks, said curtain consisting of a plurality of slats formed with alined openings, tapes extending longitudinally of the curtain through the openings in the slats with their upper ends secured to the roller, said slats being fixed to the tapes, the tapes being cut between certain of the slots to form upper and lower curtain sections, links extending longitudinally between the upper and lower sections of the tapes and having their end portions slotted for limited longitudinal movement permitting the curtain sections to have limited shifting movement relative to each other, dogs carried by the lower slat of the upper curtain section, and a cam carried by the upper slat of the lower curtain section for engaging between the dogs and moving the dogs into gripping engagement with the racks to prevent raising of the curtain by shifting the curtain upwardly from its lower end.

HENRY A. KRUEGER.